(12) United States Patent
Kambhatla

(10) Patent No.: US 10,474,614 B2
(45) Date of Patent: Nov. 12, 2019

(54) FUNCTION EXTENDERS FOR ENHANCING A DISPLAYPORT FEATURE SET

(71) Applicant: Intel Corporation, Santa Clara, CA (US)

(72) Inventor: Srikanth Kambhatla, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 77 days.

(21) Appl. No.: 15/087,748

(22) Filed: Mar. 31, 2016

(65) Prior Publication Data

US 2017/0286348 A1    Oct. 5, 2017

(51) Int. Cl.
*G06F 13/42*    (2006.01)
*G06F 13/40*    (2006.01)

(52) U.S. Cl.
CPC ...... *G06F 13/4081* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 5,889,835 A * | 3/1999 | Estes | ......................... | H04B 3/46 324/523 |
| 8,094,684 B2 * | 1/2012 | Lu | ......................... | G09G 5/003 370/293 |
| 8,316,150 B2 * | 11/2012 | Sarosi | ..................... | H04N 7/162 709/203 |
| 8,380,912 B2 * | 2/2013 | Jaramillo | ............... | G09G 5/006 345/1.1 |
| 8,760,280 B2 * | 6/2014 | Piccolo, III | ............ | G08B 17/00 307/117 |
| 2002/0059638 A1 * | 5/2002 | Oz | ..................... | H04N 7/17318 725/129 |

(Continued)

OTHER PUBLICATIONS

PCT Application No. PCT/US2017/016716, International Search Report and the Written Opinion, dated May 18, 2017, 13 pgs.

(Continued)

*Primary Examiner* — Elias Mamo
(74) *Attorney, Agent, or Firm* — Womble Bond Dickinson (US) LLP

(57) ABSTRACT

Function extender devices for enhancing feature sets for display arrangements having source devices and sink devices are disclosed. In one embodiment, a non-addressable device is disclosed for use in a system having a source and a sink to communicate with each other via a bus, where the non-addressable device comprises a functional logic block for coupling between the source and the sink and operable to perform at least one function on data of one or both of the first channel for video and audio data or data of a sideband channel received from the source, where the data of the first channel for video and audio data and data of a sideband channel are received from the source being addressed to the sink. The device also comprises a Physical (PHY) repeater operable to transmit data of both the first channel and the sideband channel after performance of the at least one function by the functional logic block on the data of one or both of the first channel or the sideband channel received from the source.

25 Claims, 8 Drawing Sheets

(56) References Cited

U.S. PATENT DOCUMENTS

| | | | |
|---|---|---|---|
| 2002/0141569 A1* | 10/2002 | Norrell | H04M 11/062 379/377 |
| 2003/0214507 A1* | 11/2003 | Mawatari | G09G 5/006 345/530 |
| 2008/0162805 A1* | 7/2008 | Springfield | G06F 12/0866 711/113 |
| 2008/0294786 A1* | 11/2008 | Tinker | H04L 29/1249 709/229 |
| 2009/0279473 A1 | 11/2009 | Lu | |
| 2011/0243035 A1 | 10/2011 | Thomas et al. | |
| 2012/0079162 A1 | 3/2012 | Jaramillo | |
| 2012/0299939 A1 | 11/2012 | Whitby-Strevens | |
| 2014/0085484 A1 | 3/2014 | Kambhatla | |
| 2015/0363350 A1 | 12/2015 | Yeung et al. | |

OTHER PUBLICATIONS

International Preliminary Report on Patentability received for PCT Patent Application No. PCT/US2017/016716, dated Oct. 11, 2018, 10 pages.

* cited by examiner

FUNCTION EXTENDERS FOR ENHANCING A DISPLAYPORT FEATURE SET

FIELD OF THE INVENTION

Embodiments of the present invention relate to transferring data, including video and/or audio data, between a data source and a data sink in a computing system; more particularly, embodiments of the present invention relate to adding function(s)-performing devices between the data source and the data sink that extend the function set of the source and/or intervening branch devices.

BACKGROUND OF THE INVENTION

DisplayPort (DP) is a display interface standard of the Video Electronics Standards Association (VESA), Newark, Calif. 94560. See DisplayPort Specification, Version 1.3, September 2014. DisplayPort allows video and audio to be coupled from a computer to a video display or an audio playback system. A DisplayPort connector supports 1, 2, or 4 data pairs in a Main Link that also carries clock and optional audio signals with symbol rates of 1.62, 2.7, or 5.4 gigabits per second. The Embedded DisplayPort (eDP) standard builds on the DP standard.

Display or sink devices can be connected to source devices, such as personal computers or consumer electronic devices, either directly or through what are called branch devices. Between the source and the sink devices, there may be one or more branch devices. And between any two of these devices, there may be one or more PHY level repeaters (referred to herein as retimers).

Some source device components (e.g., SoCs) have significantly more features than just the DP transmitter (TX) functionality. Due to schedule and effort reasons, it is often the case that difficult decisions are made about exclusion of certain optional features. At times, those excluded features become more valuable due to other developments later. It is also possible that a new feature or two get introduced in the industry specification in response to interop issues or market demands. These in turn create a need for (even full featured) Source device components that are already in the market to somehow be upgraded by original equipment manufacturers (OEMs) for their upcoming platforms to include these new features. Features that do not require any hardware changes can be quickly turned around using software revisions. However, if hardware changes are required, a large amount of time is needed to design and manufacture a new product with the hardware changes.

The above reasoning for feature enhancements also apply to DP TX components in the branch devices. There are some additional reasons also. First, branch devices may have functional limitations since they are developed independently of source devices, and potentially (deliberately) targeting a specific subset of the optional DP features in the interest of cost, schedule, or power. OEMs may also be interested in using legacy branch devices with newer source devices for cost, supply, robustness, or any number of other practical reasons. This could limit the end-to-end capability from a source to a sink even though both the source and sink devices may be individually capable of a specific feature.

One way to address this problem is to create a new branch device with this feature. Such a device could be inserted after a deficient source or a deficient branch to address the capability deficiency. While less complex than a source device, branch devices are complex in their own right when compared to PHY-level repeaters: they implement functions above the PHY layer (including topology, link, and session management functions), and they usually implement MST functionality in order to not limit MST functionality downstream from the branch device. These add up to branch devices being higher power and higher cost. Lastly, a DP branch device is an addressable entity; this could be a cause for concern in some topologies that already features significant number of branch devices because the DP specification has a limit on the number of devices on a given path from a source device to a sink device.

DP's PHY repeaters (LT-Tunable PHY layer repeaters) are lightweight, low cost, low power devices that are integrated within a source device or a branch device. They are designed to serve a single function, namely enhancing electrical characteristics of a link that may have deteriorated due to connectors or long routes.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Figure 1:
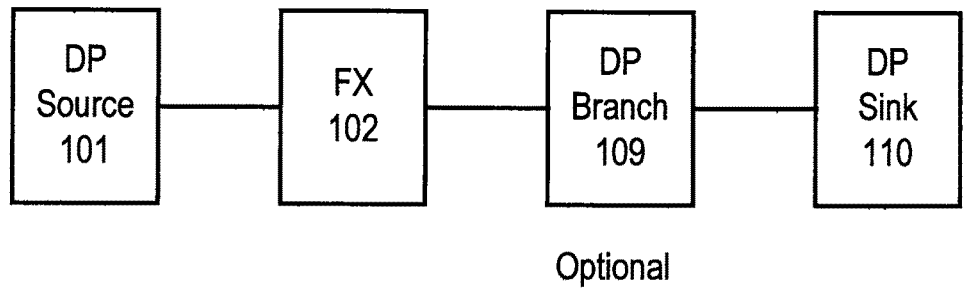
FIG. 1 illustrates a DP topology containing a DP source device, an FX device, an optional intermediate DP branch device, and a DP sink device.

A new device class is disclosed herein for use with computing platforms (e.g., systems) that employ the DisplayPort (DP) standard, or similar standards. These devices go beyond the devices that are defined in the DisplayPort specification and are referred to herein as Function Extender (FX) devices. FX devices enable feature extension without loss of existing DP functionality. That is, in one embodiment, an FX device performs a function that the DP source or branch device does not perform while having minimal impact on downstream topology or feature capabilities. In one embodiment, they are also light-weight in terms of complexity, thereby enabling a low power adding to the platform. More specifically, these devices are not addressable devices such as a branch device or a sink device. For example, in the case of DP, content is specifically addressed to the branch device and the sink FIG. 1 illustrates a DP topology containing a DP source device (typically driven by a graphics processing unit (GPU) or a system-on-chip (SOC)), an FX device, an optional intermediate DP branch device, and a DP sink device. Referring to FIG. 1, DP source 101 is communicably coupled to FX device 102. DP branch device 109 is communicably coupled between FX device 102 and DP sink device 110. DP branch device 109 is a fully addressable device that can perform routing.

Figure 2:
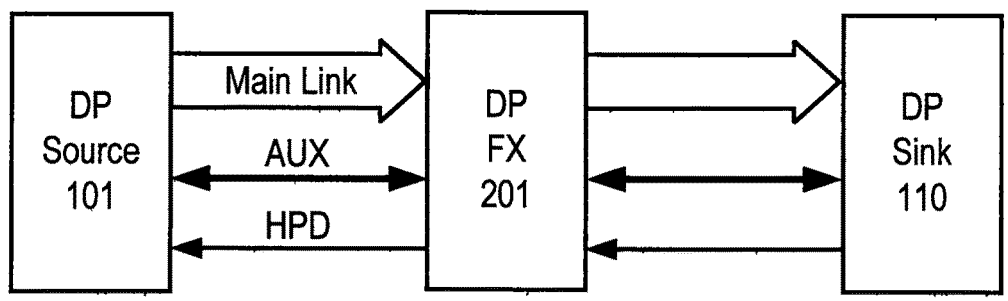
FIG. 2 illustrates an FX device in one embodiment of a DP topology.

In one embodiment, FX devices, such as FX device 102 handle all three elements of the DP bus: Main Link, Auxiliary (AUX) channel, and the hot plug-in device (HPD) line. FIG. 2 illustrates an FX device in a DP topology. Referring to FIG. 2, the DP topology is the same as shown in FIG. 1 except without the optional DP branch device. As shown, DP source device 101 is communicably coupled to DP FX device 201 via a DP Main Link channel, a DP AUX channel and a DP HPD line. DP FX device 201 is also communicably coupled to DP sink device 110 via the DP Main Link channel, the DP AUX channel and a DP HPD line.

FX device 201 is a category of DP devices that do not form a node in a given path in the sense they are not addressable entities and they do not influence routing decisions. Rather, in one embodiment, they are closely coupled to DP source device 101 and extend the functionality of DP source device 101; in particular, together with DP source device 101, they form one addressable entity in this embodiment as far as rest of the topology is concerned. Similarly, in other embodiments, they could be closely coupled with a DP branch device or a DP sink device, such as DP sink device 110 (referring to these as base devices henceforth) extending the functionality of those base devices, yet acting as a single addressable device with the base device.

Figure 3:
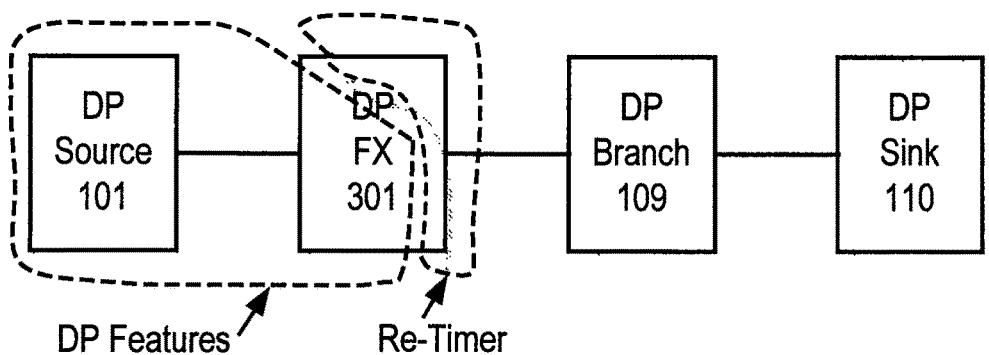
FIG. 3 illustrates one embodiment of a functional breakdown of an FX device.

FIG. 3 illustrates a functional breakdown of an FX device. With reference to FIG. 3, DP FX devices serve two roles: 1) at their core, they implement certain functions missing in the base device or they enhance an existing function in the base device, and 2) they implement DP Link-Training Tunable PHY Repeater (referred to herein as a retimer) functionality [DisplayPort Specification, Version 1.3, September 2014] to also boost the electrical characteristics of the Main Link. Thus, the FX device is a new device class that alters existing DP definition of retimers to enable addition of function extensions. This is done in a manner that retains the benefits of retimers while also enabling functionality extension beyond boosting electrical characteristics Referring to FIG. 3, DP source device 101 is communicably coupled to DP FX device 301. DP FX device 301 is communicably coupled to DP branch device 109, which is communicably coupled to DP sink device 110. DP branch device 109 is optional.

The DP specification caps the number of retimers between a DP Transmitter (e.g., source) and a DP Receiver (e.g., sink device or a branch device). The FX device could be any one of those retimers. FIG. 4A-D illustrate FX devices co-existing with re-timers.

Figure 4:
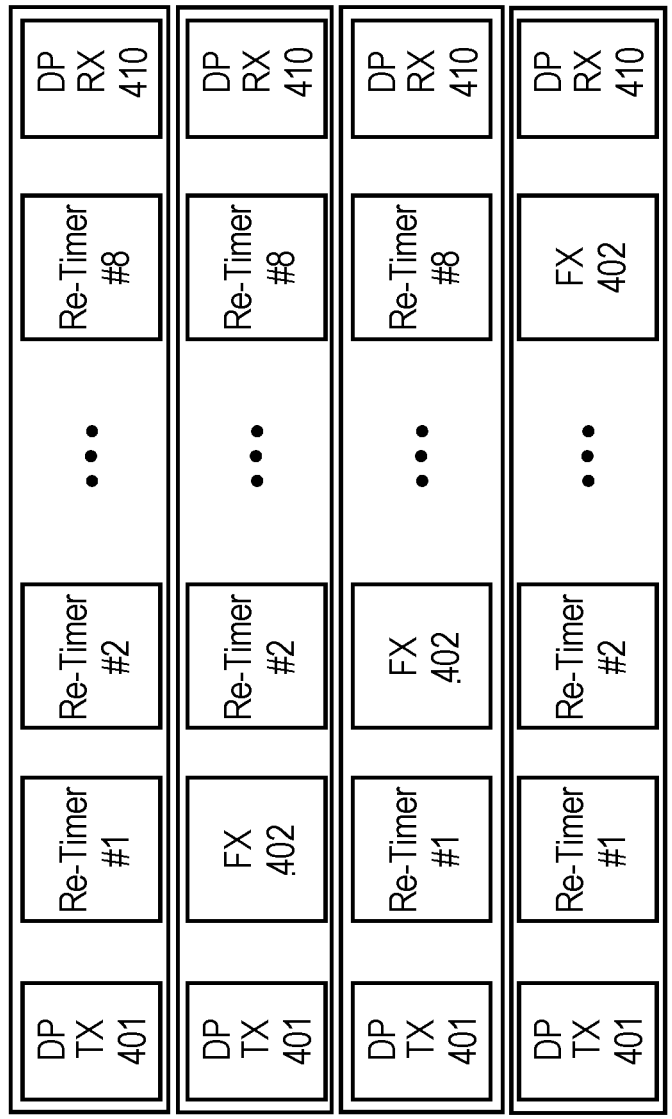
FIG. 4A-D illustrate FX devices co-existing with Re-Timers.

Referring to FIGS. 4A-D, scenario #a shows 8 re-timers on a given link in the topology between a DP transmit function (DP TX) and a DP receive function (DP RX). Scenarios #b, #c, and #d show different instances where one of the eight retimers are replaced by an FX device. More specifically, in FIG. 4A, eight retimers are used on a given link in the topology between a DP transmit function and DP receive function. In FIGS. 4B-4D, one of the eight retimers is replaced by an FX device. However, the location of the FX device with respect to the retimers changes. In other words, the FX device could be in any location amongst the re-timers on a link between a DP transmit function and a DP receive function.

In one embodiment, FX devices have the following parts: a) AUX transaction filtering, b) function extension, and c) control and configuration. The FX devices have a number of other DP functions (including HPD and IRQ_HPD) related requirements that are the same as defined in the DP specification.

AUX Transaction Filtering

In one embodiment, FX devices process AUX transactions in three different ways. First, the FX devices process and not propagate accesses to a set of DisplayPort Configuration Data (DPCD) registers carved out for FX control and configuration purposes. The carve out is such that it does not interfere with addresses already defined for other purposes in the DP specification. Second, the FX devices meet DP specification 1.3 requirements on the AUX transactions that a retimer must process and not propagate. Third, FX devices meet DP specification 1.3 requirements on AUX transactions that retimers are required not to process (and therefore propagate) other than the items in the AUX channel discussed above.

Figure 5:
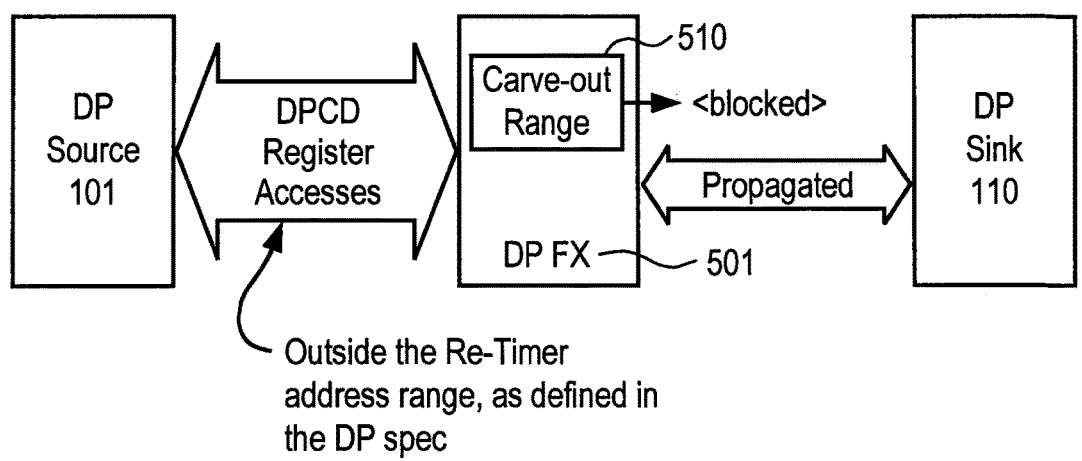
FIG. 5 illustrates one embodiment of AUX filtering in an FX device.

FIG. 5 illustrates an AUX filtering in an FX device. Referring to FIG. 5, DP source device 101 is coupled to DP sink device 110 via DP FX device 501. As shown, DP FX device 501 includes a carve-out address range 510. DPCD registers are part of the AUX channel. The certain registers are used for the re-time function of DP FX device 501 and can include registers that are for controlling or configuring the function performed by DP FX device 501. The registers that are part of the carve-out range 510, which are either to control or configure the function of the DP FX device 501 or are used as part of the re-timer function of DP FX device 501 are blocked, while the remaining DPCD registers are propagated on DP sink device 110. In other words, the DPCD registers that are outside of the re-timer address range and the address range of the functions associated with the DP FX device 501 are propagated to DP sink device 110.

Function Extension

Figure 6A:
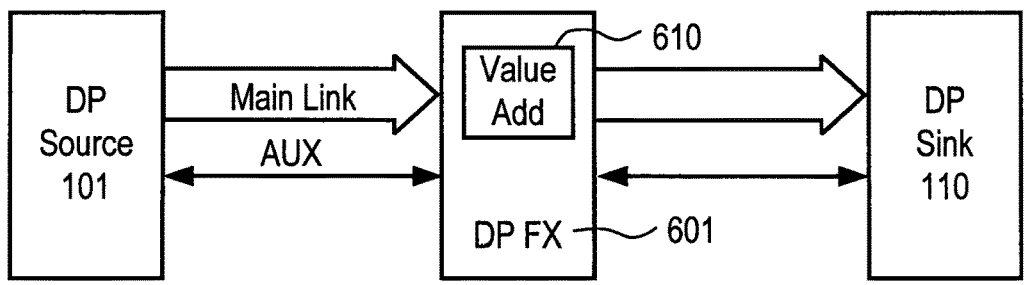
FIG. 6A illustrates an embodiment in which the enhancement or function of the DP FX device is applied to data that is transferred as part of the Main Link.
Figure 6B:
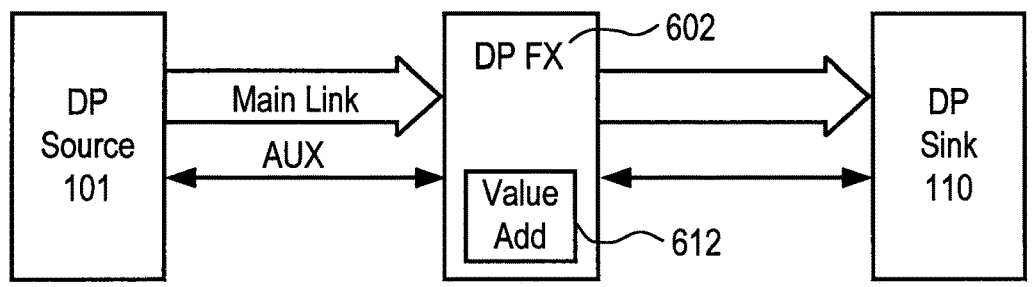
FIG. 6B illustrates an embodiment in which the enhancement or function of the DP FX device is applied to data that is transferred as part of the AUX channel.

The FX devices perform functions that could be extended either on the Main Link or on the AUX channel as shown in FIGS. 6A and 6B. For example, in the case of performing a function on the Main Link, the function may be performing an enhancement to data on the Main Link. Such an enhancement may include, but is not limited to, reformat data or enhancing and/or post-processing the video (e.g., applying a sharpening filter, performing color conversion, changing the color gamut, tune mapping, etc.) or audio data in the Main Link in some manner. In the case of performing a function on the AUX channel (or any other sideband channel part or not part of the DP specification), the function may be performing an enhancement to data on the AUX channel, which could include altering the AUX transactions.

FIGS. 6A and 6B illustrate a value add functionality in an FX device. FIG. 6A illustrates an embodiment in which the enhancement or function of the DP FX device is applied to data that is transferred as part of the Main Link. Referring to FIG. 6A, DP FX device 601 includes a value added function 610 that is performed on data (e.g., video data, audio data, etc.) the Main Link. Such an enhancement may include parsing an entire video frame from the main link that is transferring the video and/or audio data, applying a function to that data, and re-encoding that data for transfer to DP sink device 110. The data that is then forwarded to DP sink device 110 from DP FX device 601 has been enhanced.

FIG. 6B illustrates a similar arrangement except that DP FX device 602 performs the added value function 612 on data that is being transferred as part of the AUX channel. This could be needed if a certain source, branch, or a sink device implementation is entirely in hardware and the manufacturer finds a bug that requires a spin of the silicon and a consequent hit in terms of cost, development and validation effort, and to the market window. In this case, the data alters the AUX data, which may include one or more AUX transactions, that is being transferred and the altered data is forwarded on to DP sink device 110.

In one embodiment, the function applied to the Main Link and the function applied to the AUX channel could be performed on the same FX device. In one embodiment, multiple types of enhancements on the Main Link may be implemented.

Furthermore, in one embodiment, FX devices could be cascaded.

In one embodiment, an FX device can be positioned after a branch device. In one embodiment, the FX device is between one branch device and another branch device. Such an FX device may be necessary to fix deficiencies on the upstream branch device. In another embodiment, the FX device is between a branch device and a sink device.

In one embodiment, one FX device is before a branch device and another one is after the branch device. This could be when both a given source device and a given branch device are feature deficient. The FX device before the branch will extend the functionality of the device upstream from the branch device, while the FX device following the branch device addresses feature deficiency in the branch device.

In one embodiment, the functions that are being enhanced in the FX devices are unrelated to each other. For example, each of the cascaded FX devices carves out a different address range in the DPCD address space. Note that cascading devices that rely on a partially or fully overlapped set of DPCD address ranges may trip over each other and may not function as intended.

Figure 7:
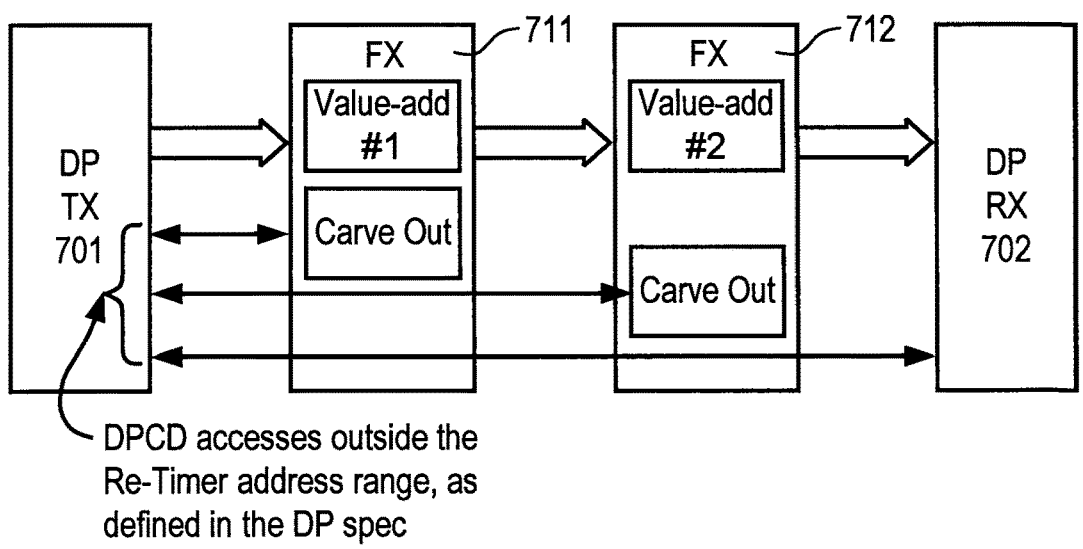
FIG. 7 illustrates cascading FX devices for multiple value-add features.

FIG. 7 illustrates cascading FX devices, which is one way to enable multiple value-add feature extensions. Referring to FIG. 7, DP transmitter 701 of a DP source device transfers data to DP RX function 702, which is part of a DP branch device or a DP sink device. The topology includes two FX devices 711 and 712. FX device 711 performs a value added function #1 on data that part of the Main Link channel. The enhanced data is then forwarded on to FX device 712 which performs added value function #2 on the data prior to the data being propagated to DP receiver 702. Note that more than two FX devices can be cascaded between DP transmitter 701 and DP receive function 702.

FX device 711 includes a carve-out of the AUX addressable space, identifying an address range of DPCD registers that are designated for controlling the re-timer function of the FX device 711 and/or control and/or configuration of its value-add function. The rest of the DPCD addresses are propagated onto the FX device 712. FX device 712 also includes carve out address range associated with its retimer function and the control and/or configuration of its function. These register accesses are prevented from propagating to DP receiver 702, while the DPCD register remaining as part of the AUX channel are forwarded on to DP receiver 702.

In one embodiment, multiple FX devices together may be accomplishing one function extension—for cost, implementation efficiency, or modularity reasons. Some problems could involve multiple passes at processing the incoming stream, and in such cases each FX device in the chain processes one pass. Thus, functions that need to be applied repeatedly can be implemented with multiple FX devices.

Figure 8:
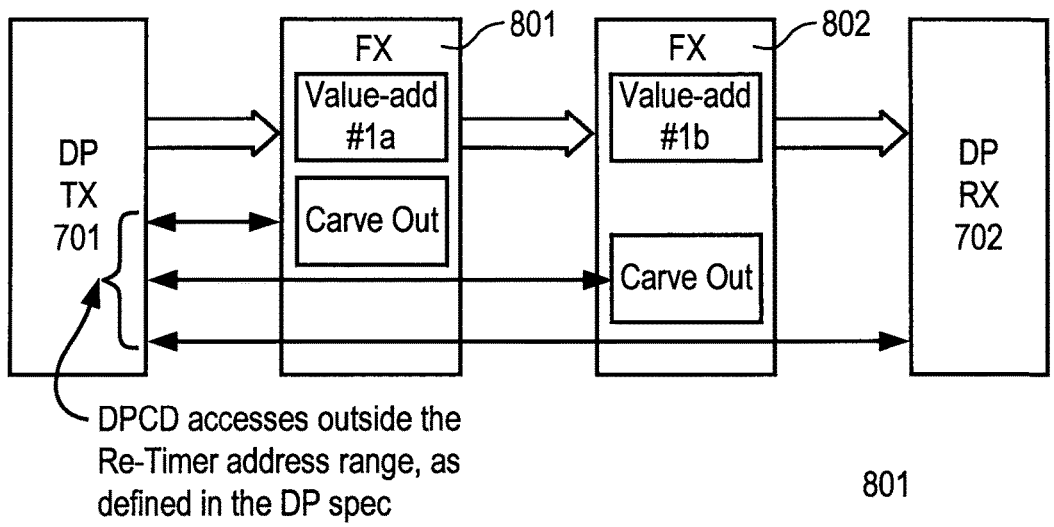
FIG. 8 illustrates FX devices working collaboratively for a single value-add feature.

FIG. 8 illustrates FX devices working collaboratively for a single value-add feature. FIG. 8 illustrates a similar arrangement to FIG. 7 except the value-added function applied to the data in the Main Link channel is spread over two FX devices. More specifically, referring to FIG. 8, FX device 801 applies value added function #1a, while FX device 802 applies value-added function #1b. Value-added function #1a and #1b together perform a single value-added feature. An example of such a feature is any function that lends itself to multi-pass operation. It may be simpler to simulate a multi-pass operation thru cascading as opposed to re-using the same block for performance (pipelining) reasons.

Control and Configuration

In one embodiment, control and configuration are implemented through the DPCD register set dedicated to the FX device. Typical control would include, but is not limited to, the following: enable or disable control for function extension; function specific configuration registers; configure aspects of the function extension, once enabled; a mode of operation: in scenarios where the input stream is not DP (e.g., it is some other transport interface), the FX device is configured into a by-pass mode where FX device essentially looks like a cable.

Figure 9:
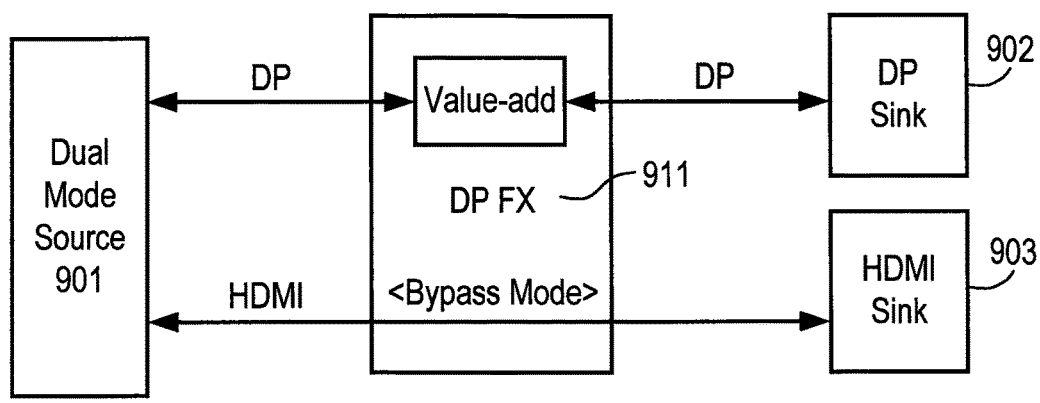
FIG. 9 illustrates one embodiment of a bypass mode to enable dual mode source devices

FIG. 9 illustrates a bypass mode to enable dual mode source devices. Referring to FIG. 9, DP FX device 911 interfaces between a dual mode source and two sinks, DP sink device 902 and HDMI sink device 903. DP FX device 911 applies a value added function to data that is part of the DP bus (e.g., Main Link channel, AUX channel, HPD line). This enhancement may be applied to video and/or audio data in the Main Link channel or data in the AUX channel. However, the HDMI data that is sent from dual mode source to HDMI sink 903 is merely passed through DP FX device 911. In this manner, DP FX device 911 operates as a cable.

Figure 10:
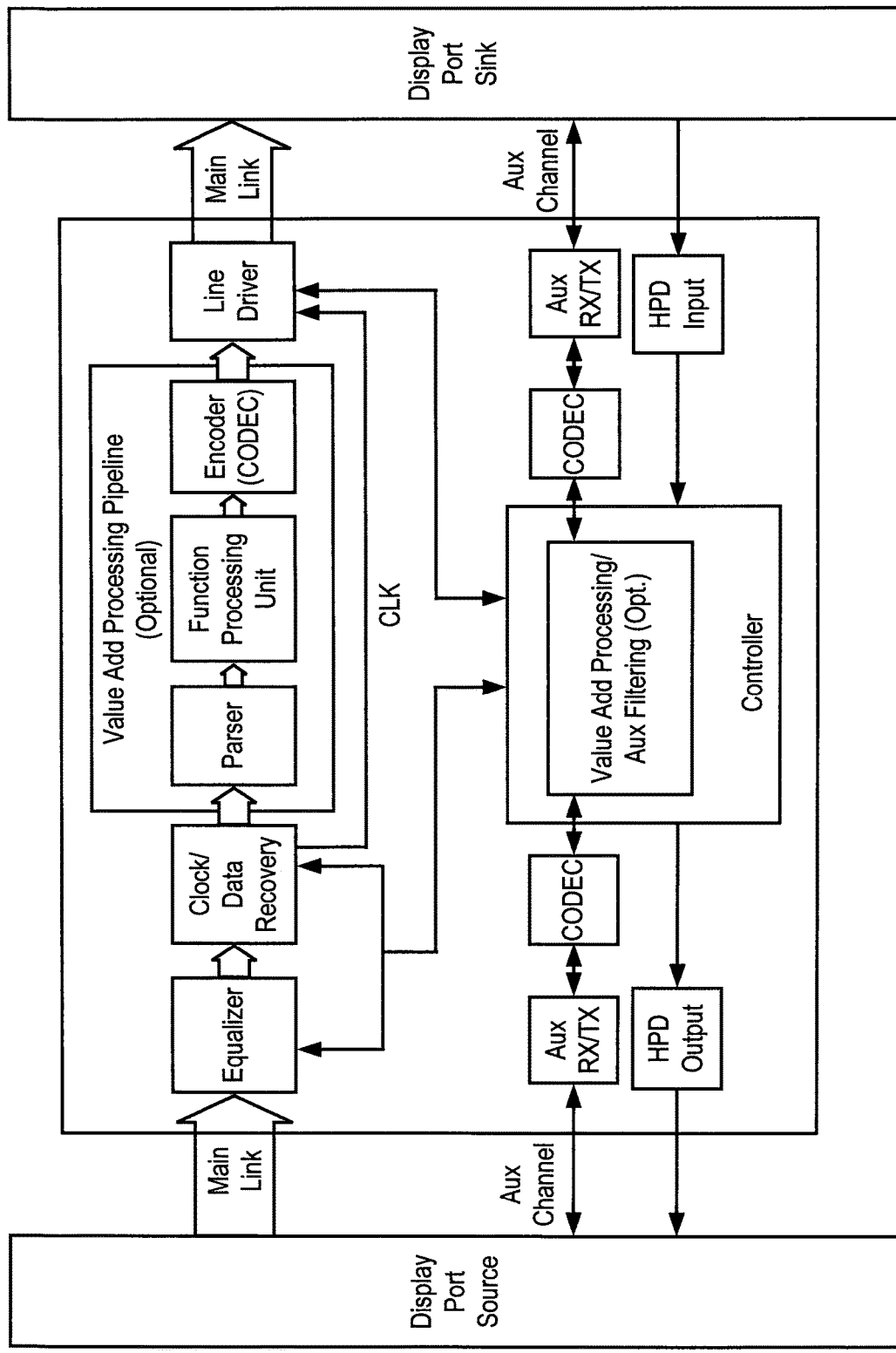
FIG. 10 is a block diagram of one embodiment of an FX device.

FIG. 10 is a block diagram of one embodiment of an FX device. Referring to FIG. 10, the path of the Main Link channel optionally includes a value add processing, or function processing, pipeline that applies a function/enhancement to data in the Main Link channel. In one embodiment, the pipeline includes a parser, functional logic to perform the FX device function, and an encoder (e.g., codec) to encoder the data so that it may be propagated to the data sink device (or branch device). Such an enhancement may include parsing an entire video frame from the main link that is transferring the video and/or audio data, applying a function to that data, and re-encoding that data for transfer to the DP sink device.

The controller controls the processing of DCPD access transactions. This may optionally include applying a value add function to data in AUX channel, such as, for example, AUX filtering and other processing of DCPD access transactions. Such functions are typically implemented in software but could be implemented by hardware (e.g., hardware state machines).

FIG. 10 also shows details regarding the repeater function of an FX device. The controller controls the repeater operation with respect to the Main Link, AUX channel and HPD line. In one embodiment, the repeater comprises typical units like HPD output and HDP input units, AUX receiving and transmitting units, coding units an equalizer, a clock/data recovery unit and a line driver.

Figure 12:
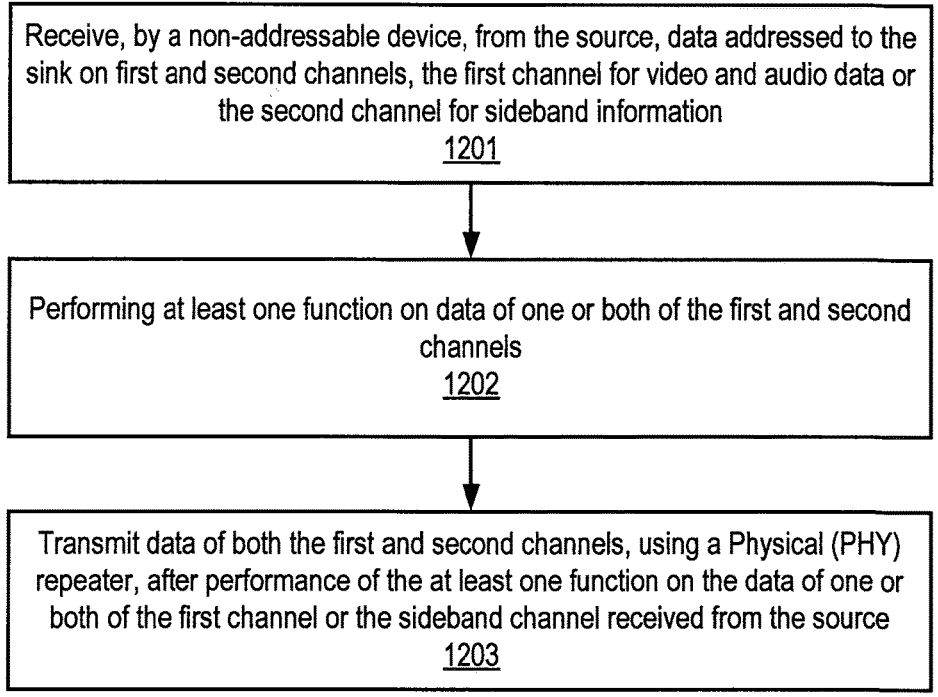
FIG. 12 is a flow diagram of one embodiment of a process for communicating data between a source device and a sink device.

FIG. 12 is a flow diagram of one embodiment of a process for communicating data between a source device and a sink device. Such a method may be used when the communication occurs in accordance with the DP specification. In one embodiment, the process is performed by processing logic that may comprise hardware (circuitry, dedicated logic, etc.), software (such as is run on a general purpose computer system or a dedicated machine), firmware, or a combination of the three.

Referring to FIG. 12, the process begins by processing logic of a non-addressable device receiving, from the source device, data addressed to the sink device on first and second channels, where the first channel for video and audio data or the second channel for sideband information (processing block 1201). In one embodiment, the source and the sink communicate using a DisplayPort (DP) bus according to the DP standard, where the first channel comprises a DP Main Link channel and the second channel comprises a DP auxiliary (AUX) channel.

Next, processing logic performs at least one function on data of one or both of the first and second channels (processing block 1202) and transmits data of both the first and second channels, using a Physical (PHY) repeater, after performance of the at least one function on the data of one or both of the first channel or the sideband channel received from the source (processing block 1203). In one embodiment, the function includes processing accesses to a set of DPCD registers in the AUX channel that are for controlling and/or configuring the functional logic block. In one embodiment, the function reformats or enhances video or audio data of the Main Link channel. In one embodiment, the function comprises multiple functions to be performed on data of the Main Link channel. In one embodiment, the function extends functionality performed by the source as the at least one function is not performed by the source. In one embodiment, the PHY repeater is a Link-Training tunable PHY repeater operable to boost electrical characteristics of the Main Link channel.

Thus, FX devices disclosed herein include one or more of the following features: extend in a lightweight, modular way DP specific functionalities in DP source devices and DP branch devices, operate as a means to process video signal on Main Link; operate as a means to enhance AUX processing; operate as a means to enhance multiple functions; are intermixed with DP Re-timers; operate with one or more other FX devices in a cascaded fashion to implement a function split over all the FX devices; operate in a cascaded manner with one or more other FX devices to enhance multiple functions in a modular fashion, where each of FX enhances a single function; and operate in platforms that include dual mode sources or dual mode branch devices to support both DP and HDMI sink devices.

Figure 11:
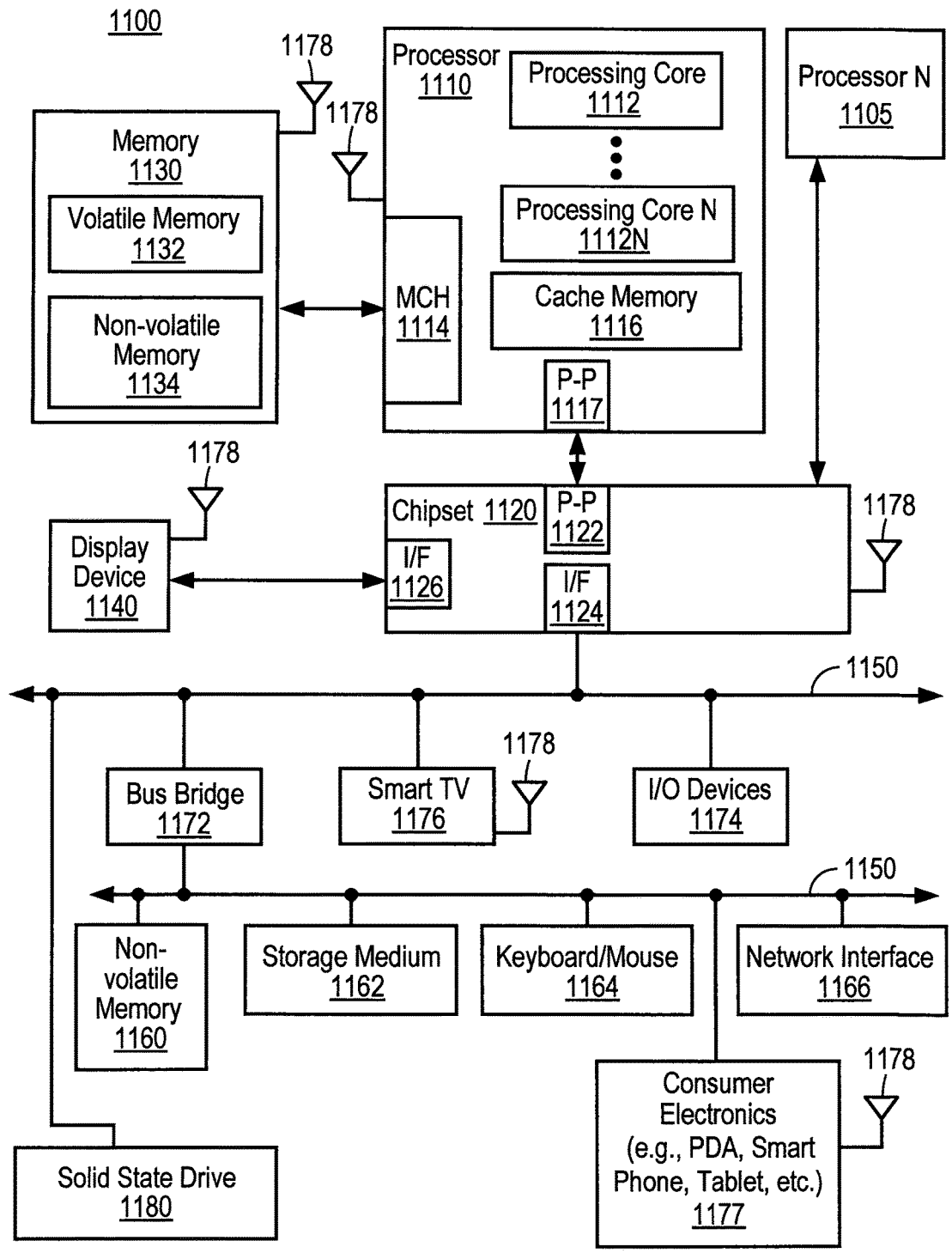
FIG. 11 is one embodiment of a system.

FIG. 11 is one embodiment of a system level diagram 1100 that may incorporate the techniques described above. That is, in one embodiment, system 1100 includes the use of the DisplayPort specification. For example, one of the cores may comprises a GPU that is part of a DP source device. For example, the techniques described above may be used in conjunction with a processor in system 1100 or other part of system 1100.

Referring to FIG. 11, system 1100 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance or any other type of computing device. In another embodiment, system 1100 implements the methods disclosed herein and may be a system on a chip (SOC) system.

In one embodiment, processor 1110 has one or more processor cores 1112 to 1112N, where 1112N represents the Nth processor core inside the processor 1110 where N is a positive integer. In one embodiment, system 1100 includes multiple processors including processors 1110 and 1105, where processor 1105 has logic similar or identical to logic of processor 1110. In one embodiment, system 1100 includes multiple processors including processors 1110 and 1105 such that processor 1105 has logic that is completely independent from the logic of processor 1110. In such an embodiment, a multi-package system 1100 is a heterogeneous multi-package system because the processors 1105 and 1110 have different logic units. In one embodiment, processing core 1112 includes, but is not limited to, pre-fetch logic to fetch instructions, decode logic to decode the instructions, execution logic to execute instructions and the like. In one embodiment, processor 1110 has a cache memory 1116 to cache instructions and/or data of the system 1100. In another embodiment of the invention, cache memory 1116 includes level one, level two and level three, cache memory, or any other configuration of the cache memory within processor 1110.

In one embodiment, processor 1110 includes a memory control hub (MCH) 1114, which is operable to perform functions that enable processor 1110 to access and communicate with a memory 1130 that includes a volatile memory 1132 and/or a non-volatile memory 1134. In one embodiment, memory control hub (MCH) 1114 is positioned outside of processor 1110 as an independent integrated circuit.

In one embodiment, processor 1110 is operable to communicate with memory 1130 and a chipset 1120. In such an embodiment, SSD 1180 executes the computer-executable instructions when SSD 1180 is powered up.

In one embodiment, processor 1110 is also coupled to a wireless antenna 1178 to communicate with any device configured to transmit and/or receive wireless signals. In one embodiment, wireless antenna interface 1178 operates in accordance with, but is not limited to, the IEEE 802.11 standard and its related family, HomePlug AV (HPAV), Ultra Wide Band (UWB), Bluetooth, WiMAX, or any form of wireless communication protocol.

In one embodiment, the volatile memory 1132 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 1134 includes, but is not limited to, flash memory (e.g., NAND, NOR), phase change memory (PCM), read-only memory (ROM), electrically erasable programmable read-only memory (EEPROM), or any other type of non-volatile memory device.

Memory 1130 stores information and instructions to be executed by processor 1110. In one embodiment, chipset 1120 connects with processor 1110 via Point-to-Point (PtP or P-P) interfaces 1117 and 1122. In one embodiment, chipset 1120 enables processor 1110 to connect to other modules in the system 1100. In one embodiment, interfaces 1117 and 1122 operate in accordance with a PtP communication protocol such as the Intel QuickPath Interconnect (QPI) or the like.

In one embodiment, chip set 1120 is operable to communicate with processor 1110, 1105, display device 1140, and other devices 1172, 1176, 1174, 1160, 1162, 1164, 1166, 1177, etc. In one embodiment, chipset 1120 is also coupled to a wireless antenna 1178 to communicate with any device configured to transmit and/or receive wireless signals.

In one embodiment, chipset 1120 connects to a display device 1140 via an interface 1126. In one embodiment, display device 1140 includes, but is not limited to, liquid crystal display (LCD), plasma, cathode ray tube (CRT) display, or any other form of visual display device. In addition, chipset 1120 connects to one or more buses 11110 and 111111 that interconnect various modules 1174, 1160, 1162, 1164, and 1166. In one embodiment, buses 11110 and 111111 may be interconnected together via a bus bridge 1172 if there is a mismatch in bus speed or communication protocol. In one embodiment, chipset 1120 couples with, but is not limited to, a non-volatile memory 1160, a mass storage device(s) 1162, a keyboard/mouse 1164, and a network interface 1166 via interface 1124, smart TV 1176, consumer electronics 1177, etc.

In one embodiment, mass storage device 1162 includes, but is not limited to, a solid state drive, a hard disk drive, a universal serial bus flash memory drive, or any other form of computer data storage medium. In one embodiment, network interface 1166 is implemented by any type of well-known network interface standard including, but not limited to, an Ethernet interface, a universal serial bus (USB) interface, a Peripheral Component Interconnect (PCI) Express interface, a wireless interface and/or any other suitable type of interface.

While the modules shown in FIG. 11 are depicted as separate blocks within the system 1100, the functions performed by some of these blocks may be integrated within a single semiconductor circuit or may be implemented using two or more separate integrated circuits.

In a first example embodiment, a non-addressable device for use in a system having a source and a sink to communicate with each other via a bus, comprises: a functional logic block for coupling between the source and the sink and operable to perform at least one function on data of one or both of the first channel for video and audio data or data of a sideband channel received from the source, where the data of the first channel for video and audio data and data of a sideband channel is received from the source being addressed to the sink; and a Physical (PHY) repeater operable to transmit data of both the first channel and the sideband channel after performance of the at least one function by the functional logic block on the data of one or both of the first channel or the sideband channel received from the source.

In another example embodiment, the subject matter of the first example embodiment can optionally include that the source and the sink communicate using a DisplayPort bus according to the DisplayPort (DP) standard, and further wherein the DP bus includes a Main Link channel, an auxiliary (AUX) channel and a Hot Plug Detect (HPD) line, and the sideband channel being the AUX channel and the video and audio data bus being the Main Link channel. In another example embodiment, the subject matter of this example embodiment can optionally include that the functional logic block is operable to process accesses to a set of DPCD registers in the AUX channel that are for one or both of controlling and configuring the functional logic block. In another example embodiment, the subject matter of this example embodiment can optionally include that the functional logic block does not propagate accesses to the set of DPCD registers.

In another example embodiment, the subject matter of the first example embodiment can optionally include that the PHY repeater is a Link-Training tunable PHY repeater operable to boost electrical characteristics of the Main Link channel.

In another example embodiment, the subject matter of the first example embodiment can optionally include that the at least one function reformats or enhances video or audio data of the Main Link channel.

In another example embodiment, the subject matter of the first example embodiment can optionally include that the at least one function comprises a set of partial functions to be performed on the data of the Main Link channel.

In another example embodiment, the subject matter of the first example embodiment can optionally include that at least one function extends a feature set implemented by the source since the function(s) is (are) not performed by the source.

In another example embodiment, the subject matter of the first example embodiment can optionally include that the at least one function is operable in conjunction with at least one other function performed by a second non-addressable device having another functional logic block operable to perform the at least one other function when the first and second non-addressable devices are coupled together in a cascaded arrangement. In another example embodiment, the subject matter of this example embodiment can optionally include that the at least one function and the at least one other function are portions of an operation split over the first non-addressable device and the at least one second non-addressable device.

In a second example embodiment, a system comprises: a source; a sink operable to communicate with the source using a DisplayPort (DP) bus that adheres to the DP standard, wherein the DP bus includes a Main Link channel, an auxiliary (AUX) channel and a Hot Plug Detect (HPD) line; a first non-addressable device coupled between the source and the sink for use in a system having a source and a sink, where the non-addressable device comprises a first functional logic block for coupling between the source and the sink and operable to perform at least one function on data of one or both of the Main Link channel or data of the AUX channel received from the source, the data of the Main Link channel and the data of the AUX channel being addressed to the sink; and a Link-Training tunable Physical (PHY) repeater operable to transmit data of both the Main Link channel and the AUX channel after performance of the at least one function by the first functional logic block on the data of one or both of the Main Link channel or the AUX channel received from the source.

In another example embodiment, the subject matter of the second example embodiment can optionally include that the first functional logic block is operable to process accesses to a set of DPCD registers in the AUX channel that are for one or both of controlling and configuring the first functional logic block. In another example embodiment, the subject matter of this example embodiment can optionally include that the first functional logic block does not propagate accesses to the set of DPCD registers.

In another example embodiment, the subject matter of the second example embodiment can optionally include that the repeater is operable to boost electrical characteristics of the Main Link channel.

In another example embodiment, the subject matter of the second example embodiment can optionally include a second non-addressable device coupled in a cascaded arrangement with the first non-addressable device and having a second functional logic block operable to perform the at least one other function to the data of the Main Link or AUX to which the at least one function of the first non-addressable device is performed. In another example embodiment, the subject matter of this example embodiment can optionally include that the at least one function and the at least one other function are portions of an operation split over the first non-addressable device and the second non-addressable device.

In another example embodiment, the subject matter of the second example embodiment can optionally include that the first non-addressable device is cascadable with up to seven other non-addressable devices operable to perform functions on data of one or both of the Main Link channel or data of the AUX channel received from the source.

In a third example embodiment, a method for use in a computing system having a source that sends data addressed to a sink, comprises: receiving, by a non-addressable device, from the source, data addressed to the sink on first and second channels, the first channel for video and audio data or the second channel for sideband information; performing at least one function on data of one or both of the first and second channels; and transmitting data of both the first and second channels, using a Physical (PHY) repeater, after performance of the at least one function on the data of one or both of the first channel or the sideband channel received from the source.

In another example embodiment, the subject matter of the third example embodiment can optionally include that the source and the sink communicate using a DisplayPort (DP) bus according to the DP standard, and further wherein the first channel comprises a DP Main Link channel and the second channel comprises a DP auxiliary (AUX) channel. In another example embodiment, the subject matter of this example embodiment can optionally include that the at least one function includes processing accesses to a set of DPCD registers in the AUX channel that are for one or both of controlling and configuring the functional logic block.

In another example embodiment, the subject matter of the third example embodiment can optionally include that the PHY repeater is a Link-Training tunable PHY repeater operable to boost electrical characteristics of the Main Link channel.

In another example embodiment, the subject matter of the third example embodiment can optionally include that the at least one function reformats or enhances video or audio data of the Main Link channel.

In another example embodiment, the subject matter of the third example embodiment can optionally include that the at least one function comprises multiple functions to be performed on the data of the Main Link channel.

In another example embodiment, the subject matter of the third example embodiment can optionally include that the at least one function extends functionality performed by the source as the at least one function is not performed by the source.

In a fourth example embodiment, an article of manufacture has one or more non-transitory computer readable media storing instructions which, when executed by a system having a source that sends data addressed to a sink, cause the system to perform a method comprising: receiving, by a non-addressable device, from the source, data addressed to the sink on first and second channels, the first channel for video and audio data or the second channel for sideband information; performing at least one function on data of one or both of the first and second channels; and transmitting data of both the first and second channels, using a Physical (PHY) repeater, after performance of the at least one function on the data of one or both of the first channel or the sideband channel received from the source.

In another example embodiment, the subject matter of the fourth example embodiment can optionally include that the source and the sink communicate using a DisplayPort (DP) bus according to the DP standard, and further wherein the first channel comprises a DP Main Link channel and the second channel comprises a DP auxiliary (AUX) channel. In another example embodiment, the subject matter of this example embodiment can optionally include that the at least one function includes processing accesses to a set of DPCD registers in the AUX channel that are for one or both of controlling and configuring the functional logic block.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A non-addressable device for use in a system having a source and a sink to communicate with each other via a bus, the non-addressable device comprising:
   a functional logic block for coupling between the source and the sink and operable to perform at least one function on data of one or both of a first channel for video and audio data or data of a sideband channel received from the source, the data of the first channel for video and audio data and data of a sideband channel received from the source being addressed to the sink; and
   a Physical (PHY) repeater operable to transmit data of both the first channel and the sideband channel after performance of the at least one function by the functional logic block on the data of one or both of the first channel or the sideband channel received from the source, wherein the non-addressable device is cascaded with another non-addressable device operable to perform at least one other function on data of the first channel or sideband channel different from the function performed by the functional block of the non-addressable device and wherein the at least one function is operable in conjunction with the at least one other function performed by the another non-addressable device having another functional logic block operable to perform the at least one other function when the non-addressable devices are cascaded together.

2. The non-addressable device defined in claim 1 wherein the source and the sink communicate using a DisplayPort bus according to the DisplayPort (DP) standard, and further wherein the DP bus includes a Main Link channel, an auxiliary (AUX) channel and a Hot Plug Detect (HPD) line, and the sideband channel being the AUX channel and the video and audio data bus being the Main Link channel.

3. The non-addressable device defined in claim 2 wherein the functional logic block is operable to process accesses to a set of DPCD registers in the AUX channel that are for one or both of controlling and configuring the functional logic block.

4. The non-addressable device defined in claim 3 wherein the functional logic block does not propagate accesses to the set of DPCD registers.

5. The non-addressable device defined in claim 2 wherein the PHY repeater is a Link-Training tunable PHY repeater operable to boost electrical characteristics of the Main Link channel.

6. The non-addressable device defined in claim 2 wherein the at least one function reformats or enhances video or audio data of the Main Link channel.

7. The non-addressable device defined in claim 2 wherein the at least one function comprises a set of partial functions to be performed on the data of the Main Link channel.

8. The non-addressable device defined in claim 2 wherein at least one function extends a feature set implemented by the source where the at least one function is not performed by the source.

9. The non-addressable device defined in claim 1 wherein the at least one function and the at least one other function are portions of an operation split over the non-addressable devices.

10. A system comprising:
    a source;
    a sink operable to communicate with the source using a DisplayPort (DP) bus that adheres to the DP standard, wherein the DP bus includes a Main Link channel, an auxiliary (AUX) channel and a Hot Plug Detect (HPD) line;
    a first non-addressable device coupled between the source and the sink for use in a system having a source and a sink, the first non-addressable device comprising
       a first functional logic block for coupling between the source and the sink and operable to perform at least one function on data of one or both of the Main Link channel or data of the AUX channel received from the source, the data of the Main Link channel and the data of the AUX channel being addressed to the sink; and
       a Link-Training tunable Physical (PHY) repeater operable to transmit data of both the Main Link channel and the AUX channel after performance of the at least one function by the first functional logic block on the data of one or both of the Main Link channel or the AUX channel received from the source; and
    a second non-addressable device cascaded with the first non-addressable device operable to perform at least one other function on data of the Main Link channel or AUX channel different from the function performed by the first functional logic block of the first non-addressable device and wherein the second non-addressable device having a second functional logic block operable to perform the at least one other function to the data of the Main Link or AUX to which the at least one function of the first non-addressable device is performed.

11. The system device defined in claim 10 wherein the first functional logic block is operable to process accesses to a set of DPCD registers in the AUX channel that are for one or both of controlling and configuring the first functional logic block.

12. The system defined in claim 11 wherein the first functional logic block does not propagate accesses to the set of DPCD registers.

13. The system defined in claim 10 wherein the repeater is operable to boost electrical characteristics of the Main Link channel.

14. The system defined in claim 10 wherein the at least one function and the at least one other function are portions of an operation split over the first non-addressable device and the second non-addressable device.

15. The system defined in claim 10 wherein the first non-addressable device is cascadable with up to seven other non-addressable devices operable to perform functions on data of one or both of the Main Link channel or data of the AUX channel received from the source.

16. A method for use in a computing system having a source that sends data addressed to a sink, the method comprising:
- receiving, by cascaded non-addressable devices, from the source, data addressed to the sink on first and second channels, the first channel for video and audio data or the second channel for sideband information;
- performing at least one function by at least one non-addressable device and one other function by another non-addressable device different from the function performed by the at least one non-addressable device on data of one or both of the first and second channels; and
- transmitting data of both the first and second channels, using a Physical (PHY) repeater, after performance of the at least one function and the at least one other function on the data of one or both of the first channel or the sideband channel received from the source and wherein the at least one function is operable in conjunction with the at least one other function performed by the another non-addressable device to perform the at least one other function when the non-addressable devices are cascaded together.

17. The method defined in claim 16 wherein the source and the sink communicate using a DisplayPort (DP) bus according to the DP standard, and further wherein the first channel comprises a DP Main Link channel and the second channel comprises a DP auxiliary (AUX) channel.

18. The method defined in claim 17 wherein the at least one function includes processing accesses to a set of DPCD registers in the AUX channel that are for one or both of controlling and configuring the functional logic block.

19. The method defined in claim 17 wherein the PHY repeater is a Link-Training tunable PHY repeater operable to boost electrical characteristics of the Main Link channel.

20. The method defined in claim 17 wherein the at least one function or the at least one other function reformats or enhances video or audio data of the Main Link channel.

21. The method defined in claim 17 wherein the at least one function and at least one other function comprise multiple functions to be performed on the data of the Main Link channel.

22. The method defined in claim 17 wherein the at least one function extends functionality performed by the source as the at least one function is not performed by the source.

23. An article of manufacture having one or more non-transitory computer readable media storing instructions which, when executed by a system having a source that sends data addressed to a sink, cause the system to perform a method comprising:
- receiving, by cascaded non-addressable devices, from the source, data addressed to the sink on first and second channels, the first channel for video and audio data or the second channel for sideband information;
- performing at least one function by at least one non-addressable device and one other function by another non-addressable device different from the function performed by the at least one non-addressable device on data of one or both of the first and second channels; and
- transmitting data of both the first and second channels, using a Physical (PHY) repeater, after performance of the at least one function on the data of one or both of the first channel or the sideband channel received from the source and wherein the at least one function is operable in conjunction with the at least one other function performed by the another non-addressable device to perform the at least one other function when the non-addressable devices are cascaded together.

24. The article of manufacture defined in claim 23 wherein the source and the sink communicate using a DisplayPort (DP) bus according to the DP standard, and further wherein the first channel comprises a DP Main Link channel and the second channel comprises a DP auxiliary (AUX) channel.

25. The article of manufacture defined in claim 24 wherein the at least one function includes processing accesses to a set of DPCD registers in the AUX channel that are for one or both of controlling and configuring the functional logic block.

* * * * *